US008463928B2

(12) United States Patent
Gallant et al.

(10) Patent No.: US 8,463,928 B2
(45) Date of Patent: Jun. 11, 2013

(54) EFFICIENT MULTIPLE FILTER PACKET STATISTICS GENERATION

(75) Inventors: John Kenneth Gallant, Plano, TX (US); Karl Henderson, Dallas, TX (US)

(73) Assignee: Verisign, Inc., Mountain View, CA (US)

( * ) Notice: Subject to any disclaimer, the term of this patent is extended or adjusted under 35 U.S.C. 154(b) by 640 days.

(21) Appl. No.: 12/606,840

(22) Filed: Oct. 27, 2009

(65) Prior Publication Data

US 2011/0099284 A1   Apr. 28, 2011

(51) Int. Cl.
*G06F 15/16* (2006.01)
(52) U.S. Cl.
USPC .......................................... 709/231; 709/230
(58) Field of Classification Search
USPC .................................................. 709/230, 231
See application file for complete search history.

(56) References Cited

U.S. PATENT DOCUMENTS

| | | | |
|---|---|---|---|
| 5,515,376 A | 5/1996 | Murthy et al. | |
| 6,006,318 A * | 12/1999 | Hansen et al. | 712/28 |
| 6,397,252 B1 * | 5/2002 | Sadiq | 709/226 |
| 2001/0037443 A1 | 11/2001 | Liu | |
| 2004/0181599 A1 | 9/2004 | Kreusch et al. | |
| 2005/0076169 A1 * | 4/2005 | Modelski et al. | 710/100 |
| 2006/0156046 A1 | 7/2006 | Jacobson et al. | |
| 2008/0117913 A1 | 5/2008 | Tatar et al. | |
| 2009/0073981 A1 | 3/2009 | Coyte et al. | |
| 2009/0080421 A1 | 3/2009 | Ou | |
| 2010/0057932 A1 * | 3/2010 | Pope et al. | 709/236 |

OTHER PUBLICATIONS

International Search Report and Written Opinion dated Dec. 16, 2010 for the corresponding PCT application PCT/US2010/53230.

* cited by examiner

*Primary Examiner* — Wing F Chan
*Assistant Examiner* — Andrew Woo
(74) *Attorney, Agent, or Firm* — MH2 Technology Law Group, LLP

(57) ABSTRACT

Incoming data streams are managed by receiving a data stream on at least one network interface card (NIC) and performing operations on the data stream using a first process running several first threads for each network interface card and at least one group of second multiple processes each with an optional group of second threads. The first process and the one or more groups of second multiple processes are independent and communicate via the shared memory. The first threads for each network interface card are different than the group of second threads. The system includes at least one network interface card that receives a data stream, a first processor that runs a first process that uses a plurality of first threads for each network interface card and a second processor that runs at least one group of second multiple processes each with an optional group of second threads. The first process and the one or more groups of second multiple processes are independent and communicate via the shared memory.

25 Claims, 8 Drawing Sheets

EFFICIENT MULTIPLE FILTER PACKET STATISTICS GENERATION

BACKGROUND OF THE INVENTION

In networking, computers communicates with each another by sending and receiving information through shared channels, which are designed for networking purposes. Network interface cards (NICs), which are hardware devices that are installed on computers, are used to enable networking and to support the networking preferences that are maintained by computer users. For example, NICs are used to assign unique addresses called a MAC (media access control) to the computer on which it is installed. NICs also include hubs or switches, which behave like relays that pass information between computers using the MAC addresses. NICs are used by computers to receive incoming data streams.

Since most operating systems include a general utility for reading all packets coming to a NIC, computers usually use this general utility to operate the installed NIC. Applications typically incorporate this general utility by either using the general utility, as provided in the operating system, or by using a similar utility. In this context, typical processing of incoming data streams would include receiving packets, examining the packets and maintaining some main-memory data structure(s) with information about the packets. FIG. 1 illustrates this processing.

In FIG. 1, a computer 110 with multiple central processing units, receives three full packet data streams 120a, 120b, and 120c, which are processed using the three different processes, Process I (140a), Process II (140b), and Process III (140c). The three processes 140a, 140b, and 140c are independent processes. There are several disadvantages associated with the prior art architecture. First, there are inefficiencies that result from running more than one full bore network interface packet capture process. For example, significant computer processing resources are required to handle such a stream. If each process is separate, then the computer resources needed rapidly increase to the point where it is not feasible to run multiple applications. The second disadvantage arises from the need to dump the main memory data structures to disk files. During the dumping process, packets can be dropped and not counted by the application. These disadvantages cause problems when incoming data is monitored because of the large resources which are required to monitor data when there are multiple independent processes and applications simultaneously running on computer.

Therefore, a computer architecture, which enhances data monitoring capabilities and efficiently captures and processes streams of packets, while reducing dropped data, hardware/software cost, operational cost, and network cost, is desired.

BRIEF SUMMARY OF THE INVENTION

Embodiments of the present invention provide techniques for efficiently managing data streams by enhancing data monitoring capabilities while reducing hardware/software cost, operational cost, and network cost. Data streams are managed by providing a mechanism that combines at least two different applications, which each use high speed packet capture and filtering, into one machine.

In embodiments of the invention, software processes and threads on one machine are architected so that two separate processes are introduced that communicate via shared memory. The first process handles all the packet interfacing with the network and the second process handles saving of statistics to a disk file. Therefore, while the second process is dumping statistics to a disk file the first process still captures packets and puts them in a buffer for subsequent examination. The first process and the second processes are asynchronous. In addition, the first process can have an independent buffer for each application. The shared memory can be a message queue.

According to an embodiment of the invention, a method for managing data streams includes receiving a data stream on at least one network interface card (NIC) and performing operations on the data stream using a first process running several first threads for each network interface card. The operations performed using a first process running several first threads include generating multiple copies of the data stream, distributing the multiple copies of the data stream among multiple buffers used by a first process, and storing a portion of each of the multiple copies of the data stream in a shared memory. The method also includes performing additional operations on the processed portions of the data stream using at least one group of second multiple processes, each with an optional group of second threads. The additional operations include reading data from the shared memory to be used by a second process, which can perform in-memory interval analyses to generate statistics, and periodically saving the statistics to an interval file. The first process and the one or more groups of second multiple processes are independent and communicate via the shared memory. The first threads for each network interface card can be different than the optional group of second threads.

Each of the multiple copies of the data stream can be stored in a separate one of the multiple buffers. Further, each portion of the multiple copies of the data stream can be stored in a separate shared memory.

According to another embodiment of the invention, a system for managing data streams includes at least one network interface card that receives a data stream and a first processor, which is coupled to at least one of the network interface cards and distributes the data stream among one or more buffers. The first processor is configured to run a first process that uses one or more first threads for each network interface card. The one or more first threads access data stored in the one or more buffers, processes the accessed data, and stores the processed data in one or more shared memory. The one or more first threads can filter the data accessed from the one or more buffers for a specific characteristic and save data having a specific characteristic in a specific shared memory. The first processor can distribute copies of the data stream received by the network card and store the copies in one of the buffers. The system further includes at least one group of second multiple processes that reads data from the shared memory. The at least one group of second multiple processes each can use an optional group of second threads. The group of second threads can be used to analyze data to generate in-memory interval statistics and periodically save the statistics to an interval file. The shared memory can be a queue. The first process and the one or more groups of second multiple processes are independent and communicate via the shared memory.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of the invention may be realized by reference to the remaining por

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the invention provide systems and methods for efficiently managing data streams by enhancing data monitoring capabilities while reducing hardware/software cost, operational cost, and network cost. Monitoring is enhanced by combining into one machine at least two different applications that use high speed packet capture and filtering. The invention reduces these costs by providing a system and method that efficiently manages data streams arriving at a machine through a network interface card. The invention is particularly useful in machines having multi-cores (e.g. eight cores) because it enables efficient processing of data through one core without slowing down or shutting down other cores. Further, the invention enhances monitoring capabilities of all products.

In embodiments of the invention, software processes and threads on one machine are architected so that two separate processes are introduced that communicate via shared memory, such as a message queue. The first process handles all the data packets interfacing with the network and a second process analyzes the data packets and generates statistics. Using the first process to handle all the data packets, which interface with the network, eliminates the overhead of maintaining multiple interfaces for each application. As the first process captures data packets and saves them in a buffer for subsequent examination, the second process compiles statistics about the data packets and saves those statistics to a disk file, without slowing down the first process. The first and second processes communicate via a shared memory, such as a queue. In addition, the first process can have an independent buffer for each application. This architecture eliminates or reduces the number of packets that are dropped.

Embodiments of the invention may be implemented in hardware, software, or combinations thereof. Components of the present invention may be incorporated as standalone systems that are configured to handle information for processing with the use of at least one network interface card (NIC). Components of the present invention may also be incorporated into one or more system or systems (which may be distributed) enabling the system or systems to receive and handle information received from a network for processing with the use of a NIC. For example, an embodiment of the present invention may be incorporated into a network device such as a switch or router, thereby enabling the network device to receive and process IP addresses with the use of a NIC.

Figure 1:
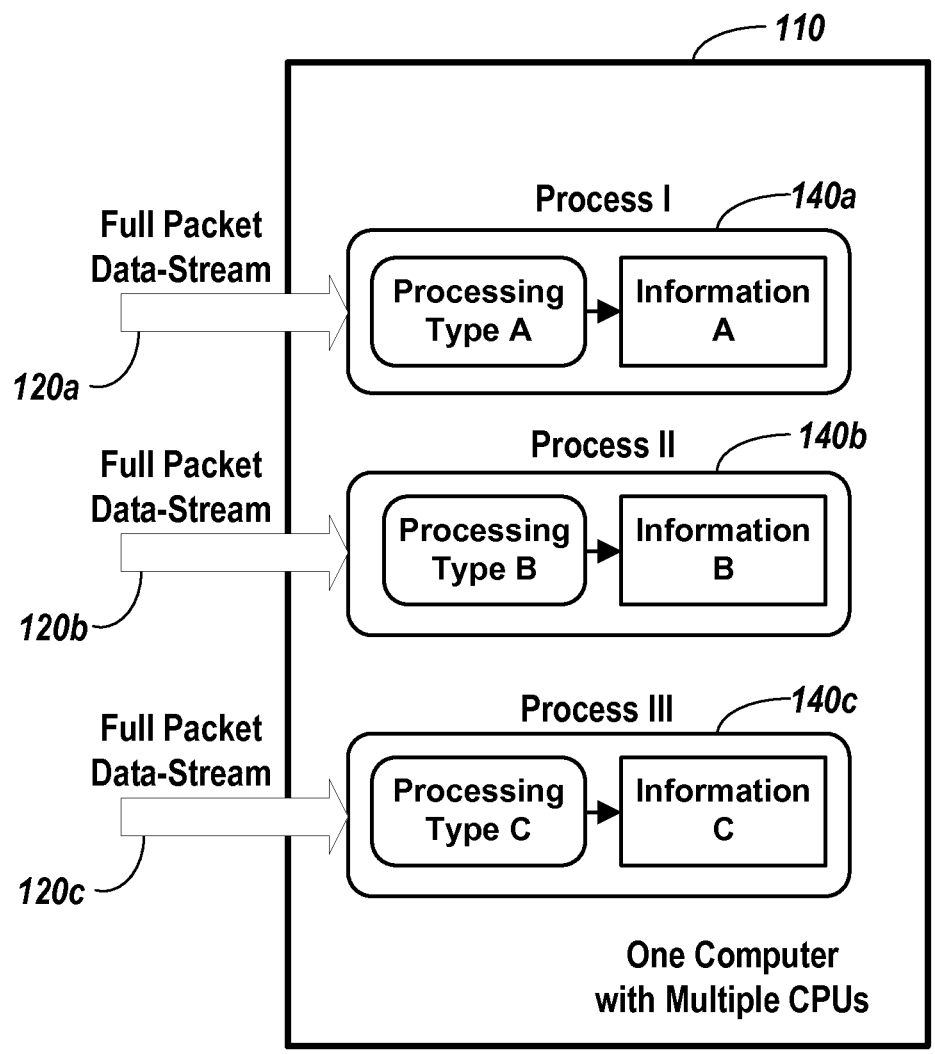
- FIG. 1 is a block diagram illustrating a prior art architecture for receiving and routing packets in a computer system.
Figure 2:
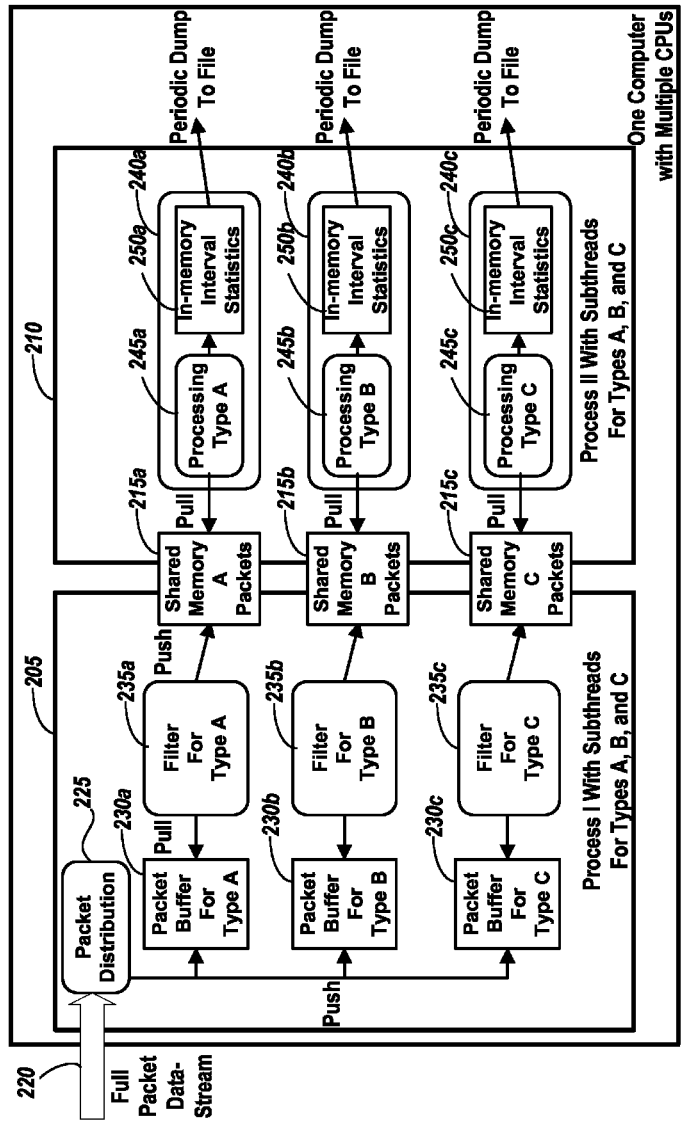
FIG. 2 is a block diagram illustrating architecture for receiving and routing packets in a computer system using two processes, in accordance with an embodiment of the invention.
Figure 3:
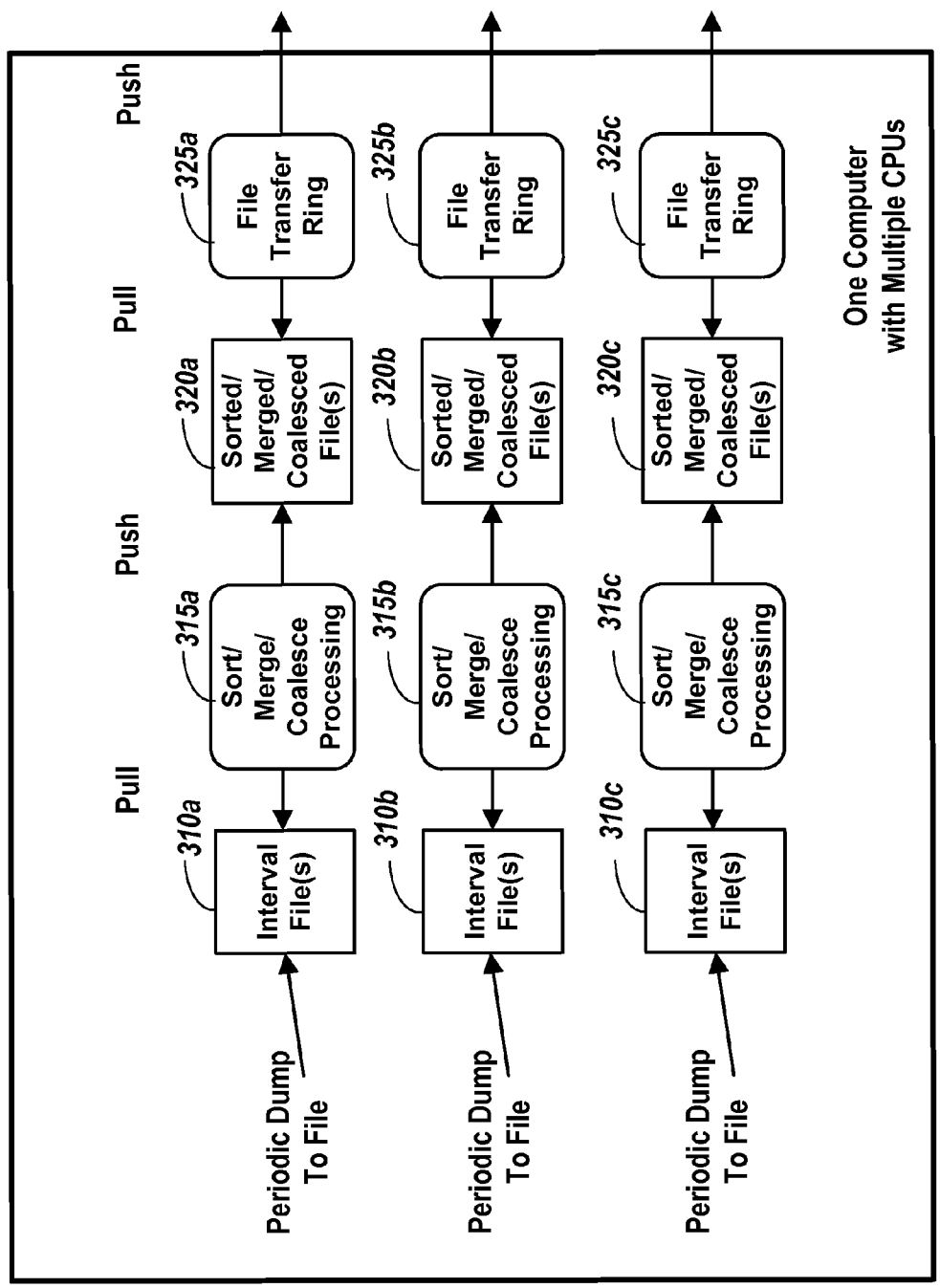
FIG. 3 is a block diagram illustrating architecture for sorting/merging/coalescing data, in accordance with an embodiment of the invention.

FIG. 2 is a block diagram illustrating architecture for receiving and routing packets in a computer system using two processes. The architecture includes a first process 205 and a second process 210 which communicate to each other through shared memories 215a, 215b, and 215c. Although FIG. 3 illustrates three shared memories 215a, 215b, and 215c, the number of shared memories can be N, where N is a finite integer greater than or equal to 1. The first process 205 receives a full packet data stream 220 and distributes the data stream 220 through a packet distribution module 225. The data stream 220 is distributed to one or more packet buffers 230a, 230b, and 230c, which can be configured for a specific purpose such as storing different data types. For example, FIG. 2 illustrates three packet buffers which are specified as "Packet Buffer For Type A" 230a, "Packet Buffer For Type B" 230b, and "Packet Buffer For Type C" 230c. The packet buffers 230a, 230b, and 230c can each be dedicated to only store the portions of data stream 220 that are identified as Type A, Type B, or Type C. The packet distribution module 225 parses the incoming full packet data stream into Types A, B and C and pushes the data to the appropriate packet buffer 230a, 230b, and 230c. In an alternative embodiment, Packet Buffer For Type A 230a, Packet Buffer For Type B 230b, and Packet Buffer For Type C 230c, can each be used to store identical information, in which case, packet distribution module 225, pushes the same data to each of the packet buffers 230a, 230b and 230c.

Filters 235a, 235b, and 235c, are each used to pull data from packet buffers 230a, 230b, and 230c respectively. The pulled data is then filtered for a specific type of data to pass through. For example, Filter For Type A 235a can filter data so that only data of Type A is pulled. Similarly, Filter For Type B 235b can filter data so that only data of Type B is pulled and Filter For Type C 235c can filter data so that only data of Type C is pulled. Once the data has been pulled and filtered by filters 235a, 235b, and 235c, the filtered data is pushed into a shared memory 215a, 215b, and 215c. The shared memory can include separate shared memories 215a, 215b, and 215c, which are each used to store data that has been filtered by filters 235a, 235b and 235c. Therefore, shared memory 215a stores Type A data that has been pushed onto it by "Filter For Type A" 235a. Similarly, shared memory 215b stores Type B data that has been pushed onto it by "Filter For Type B" 235b and shared memory 215c stores Type C data that has been pushed onto it by "Filter For Type C" 235c.

The second process 210 pulls data from the shared memory 215a, 215b, and 215c, processes this data and periodically dumps the processed data to a file. The second process 210 includes a first sub-processing module 240a, which pulls data from shared memory 215a, a second sub-processing module 240b, which pulls data from shared memory 215b, and a third sub-processing module 240c, which pulls data from shared memory 215c. Sub-processing module 240a includes a Type A module 245a for processing Type A data pulled from shared memory 215a containing Type A data and an in-memory interval statistics module 250a for performing statistical analysis on the processed Type A data. Sub-processing module 240b includes a Type B module 245b for processing Type B data pulled from shared memory 215b containing Type B data and an in-memory interval statistics module 250b for performing statistical analysis on the processed Type B data. Sub-processing module 240c includes a Type C module 245c for processing Type C data pulled from shared memory 215c containing Type C data and an in-memory interval statistics module 250c for performing statistical analysis on the processed Type C data. After data is processed by sub-processing modules 240a, 240b and 240c, the processed data is periodically dumped to a file, as is explained further with reference to FIG. 3 below.

The architecture illustrated in FIG. 2 can be for one computer with multiple central processing units (CPUs). The first process 205 can run a single process I with different sub-threads for Types A, B and C. The second process 210 can also run a single process II with different sub-threads for Types A, B and C.

In one embodiment, the first process 205 performs operations on the data stream, which is received on one or more network interface cards, using a first process running at least one sub-thread for each network interface card. Portions of the data received are distributed among the packet buffers 230a, 230b, and 230c for processing by the at least one or more sub-threads. The portions of data stored in the packet buffers 230a, 230b, and 230c are then processed with dedicated first process sub-threads, which are one of the at least one or more sub-threads. The processed portions of the data are then stored in the shared memory 215a, 215b, and 215c. The second process 210 then performs operations on the processed portions of the data stream using at least one group of second multiple sub-processes 240a, 240b, and 240c, each having an optional group of second threads. The second multiple sub-processes 240a, 240b, and 240c, then pull data from the respective shared memory 215a, 215b, and 215c, and process each of the processed portions of data s with a dedicated second process thread. The first process and the one or more groups of second multiple sub-processes are independent and communicate via the shared memory. Additionally, the sub-threads for each network interface card can be different than the optional group of second threads.

FIG. 2 also illustrates an embodiment of how software processes and threads on one machine are architected so that two separate processes are introduced that communicate via shared memory, such as a message queue. The first process handles all the data packets interfacing with the network and a second process analyzes the data packets and generates statistics. Using the first process to handle all the data packets, which interface with the network, eliminates the vast overhead of maintaining multiple interfaces for each application. As the first process captures data packets and saves them in a buffer for subsequent examination, the second process compiles statistics about the data packets and saves those statistics to a disk file, without slowing down the first process. The first and second processes communicate via a shared memory, such as a queue. In addition, the first process can have an independent buffer for each application. This architecture eliminates or reduces the number of packets that are dropped.

FIG. 3 is a block diagram illustrating an architecture for sorting/merging/coalescing data that is periodically dumped to a file by sub-processing modules 240a, 240b and 240c. FIG. 3 illustrates data of Type A, B, and C being periodically dumped to Interval Files 305a, 305b and 305c, respectively. The Sort/Merge/Coalesce Processing Module 310a, then pulls data stored in the Interval File 305a, processes the data so that the data is sorted/merged/coalesced and then pushes the sorted/merged/coalesced data to the sorted/merged/coalesced file 315a where it is stored. The Sort/Merge/Coalesce Processing Module 310a can perform any or all of the sorting, merging or coalescing functions as well as other functions. Similarly, the Sort/Merge/Coalesce Processing Modules 310b and 310c also pull data stored in the Interval File 305b and 305c, respectively, processes the data so that the data is sorted/merged/coalesced and then pushes the sorted/merged/coalesced data to the sorted/merged/coalesced files 315b and 315c where they are stored. The Sort/Merge/Coalesce Processing Modules 310b and 310c can also perform any or all of the sorting, merging or coalescing functions as well as other functions. File Transfer Ring 320a then pulls data from the sorted/merged/coalesced file 315a and pushes the pulled data out for further processing. Similarly, File Transfer Ring 320b and 320C also pull data from the sorted/merged/coalesced file 315b and 315c, respectively and push the pulled data out for further processing.

Figure 4:
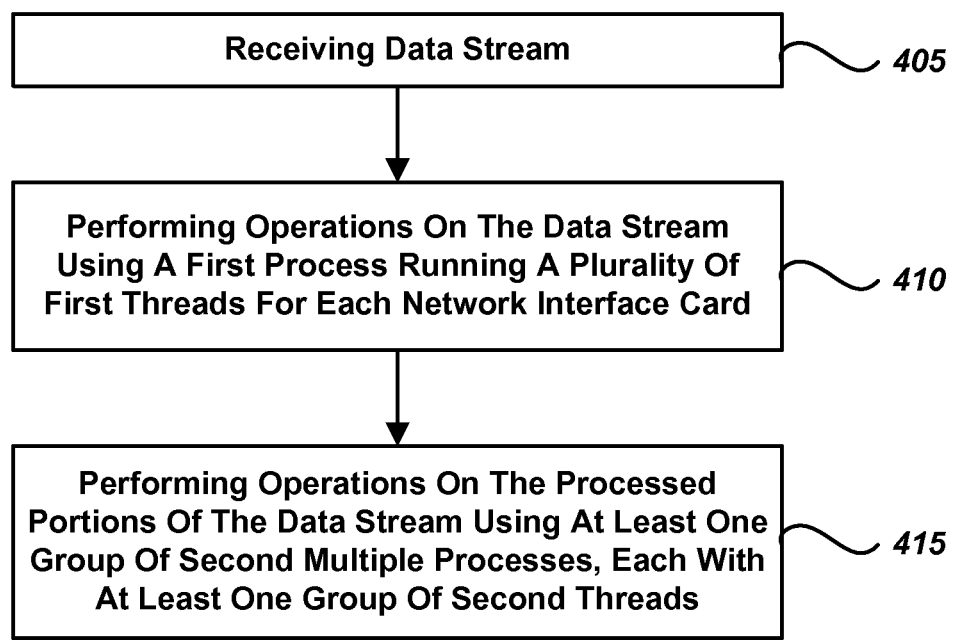
FIG. 4 is a flowchart illustrating a method of managing data streams, in accordance with an embodiment of the invention.

FIG. 4 is a flowchart illustrating a method of managing data streams, in accordance with an embodiment of the invention. The method begins in operation 405 when at least one network interface card receives a data stream. In 410, a first process running a plurality of first threads for each network interface card processes the data stream. The processing performed in operation 410 is discussed in detail below with reference to FIG. 5. Next in operation 415, the processed portions of the data stream are again processed using at least one group of second multiple processes, where each process has an optional group of second threads. The processing performed in operation 415 is discussed in detail below with reference to FIG. 6. The first process and the one or more groups of second multiple processes are independent and communicate via a shared memory. Additionally, the sub-threads for each network interface card can be different than the group of second threads.

Figure 5:
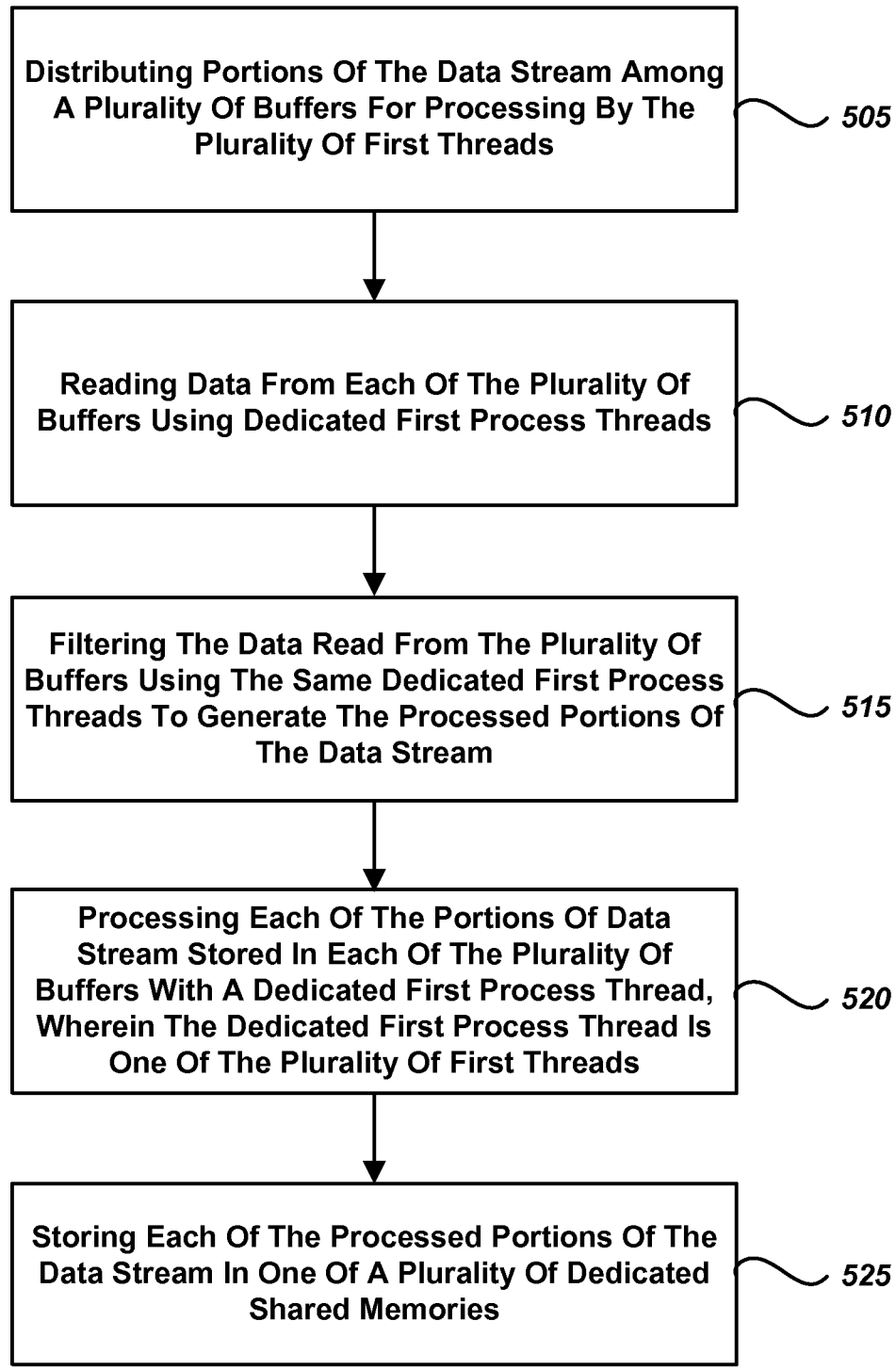
FIG. 5 is a flowchart illustrating further details of the operation 410 from FIG. 4, in accordance with an embodiment of the invention.

FIG. 5 is a flowchart illustrating further details of the operation 410 from FIG. 4, used to manage data streams, in accordance with an embodiment of the invention. In operation 505, portions of the data streams received are distributed among multiple buffers and stored in the buffers for processing by the first threads. In some embodiments, each portion of the data stream is stored in a separate one of the multiple buffers. In other embodiments, duplicates of the same data stream are stored in each one of the multiple buffers. Next in operation 510, the data stored in each of the buffers is read using dedicated first process threads. The dedicated first process thread is selected from the group of first threads. In operation 515, the data read from the buffers is filtered using the same dedicated first process thread to generate the processed portions of the data stream. In operation 520, filtered data can again be processed using the same group of process threads. Next in operation 525, each of the processed portions of the data stream is stored in one of the dedicated shared memories. In some embodiments, each of the processed portions of the data stream is stored in a separate shared memory. Alternatively, the data can be read, filtered and processed using different dedicated first process threads.

Figure 6:
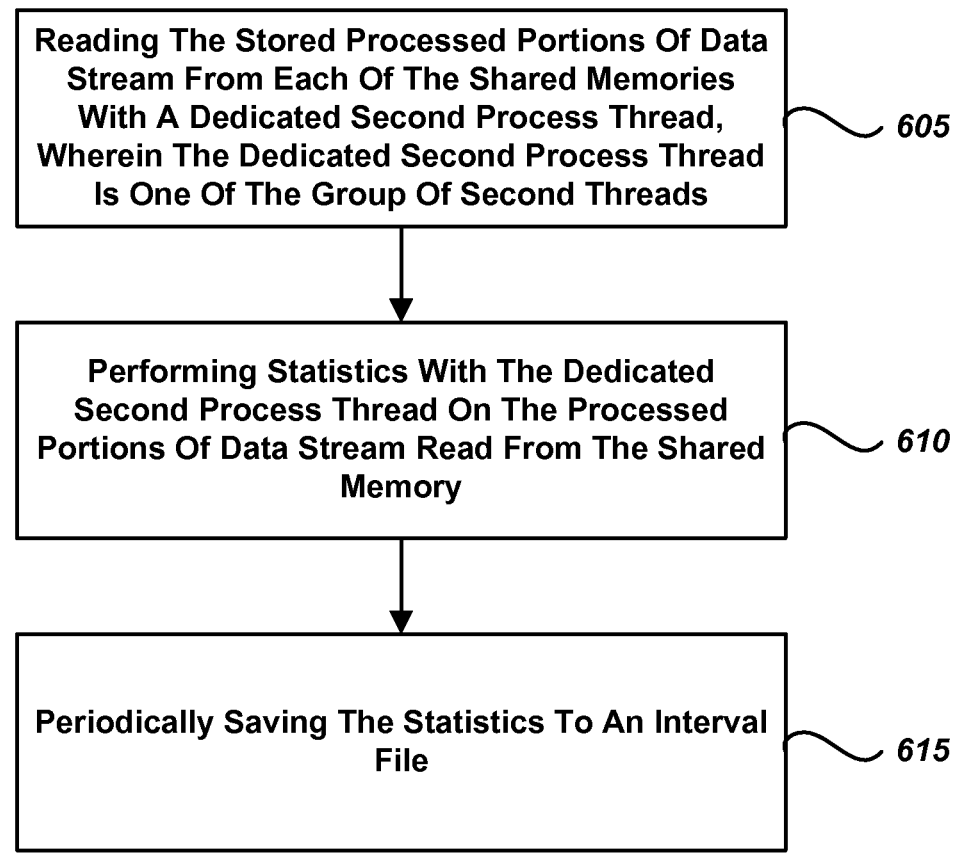
FIG. 6 is a flowchart illustrating further details of the operation 415 from FIG. 4, in accordance with an embodiment of the invention.

FIG. 6 is a flowchart illustrating further details of the operation 415 from FIG. 4, used to manage data streams, in accordance with an embodiment of the invention. In operation 605, the processed portions of the data stream that were stored in one of the dedicated shared memories during operation 525 are read with a dedicated second process thread. The dedicated second process thread is one of the threads from the group of second process threads. Next in operation 610, statistical analysis is performed on the data read. The statistical analysis can be performed with the same dedicate second process thread or with another one of the threads from the group of second process threads. The statistical analysis also generates statistics data. In operation 615, the statistics data is periodically saved to an Interval file. The periodic saving of the statistics data to the file can be configured by a user and can be, for example, once per day, or once per hour. In another embodiment, the statistics data can be periodically saved to the Interval file when the size of the statistics data reaches some threshold.

In the embodiments described with reference to FIGS. 5-6, the first process and the one or more groups of second multiple processes, each with an optional group of second threads, are independent and communicate with each other via the shared memory. The set of first threads for each network interface card can be different than the optional group of second threads. In some embodiments the first process and the one or more groups of second multiple sub-processes are asynchronous.

Figure 7:
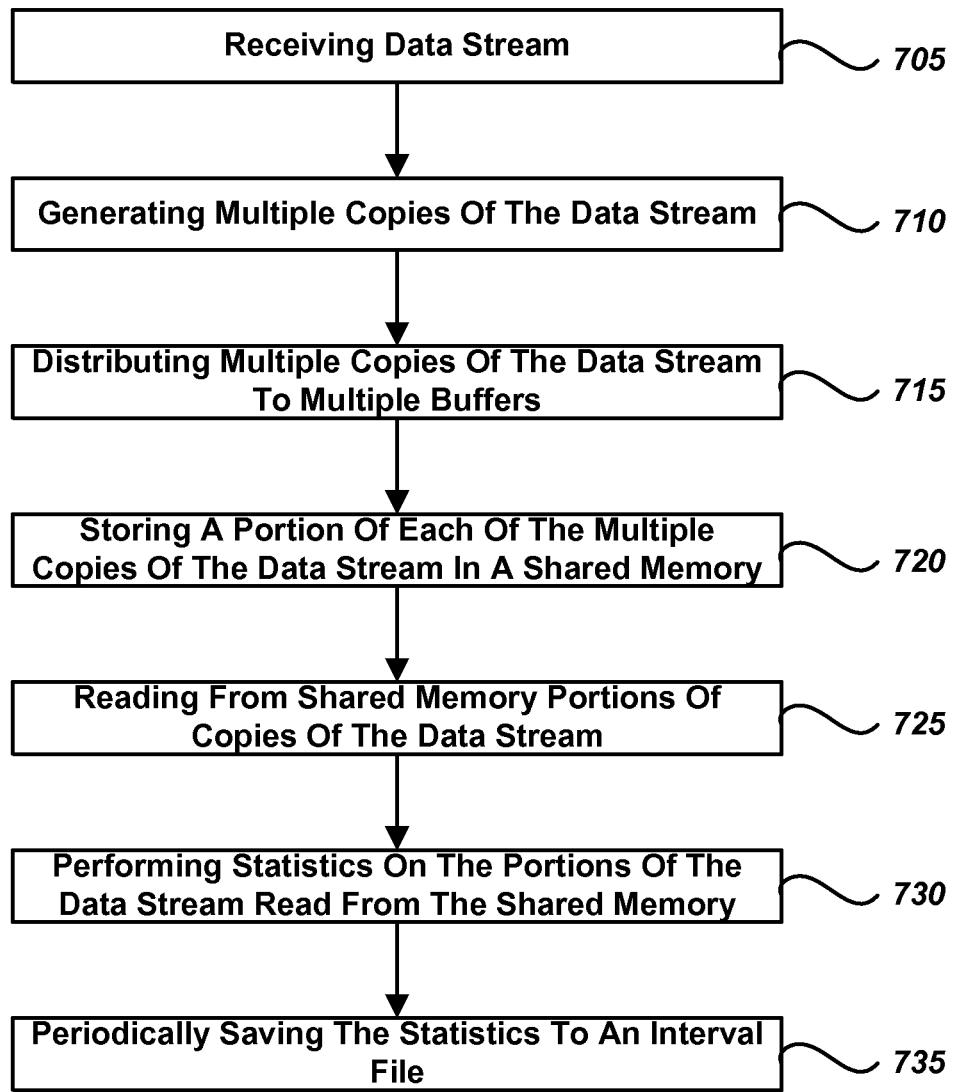
FIG. 7 is a flowchart illustrating a method of managing data streams, in accordance with an embodiment of the invention.

FIG. 7 is a flowchart illustrating another method of managing data streams, in accordance with an embodiment of the invention. The method begins in operation 705 when at least one network interface card receives a data stream. In operation 710, multiple copies of the received data stream are generated. Next in operation 715, the multiple copies of the data stream are distributed to multiple buffers. The multiple buffers are then read and the data is processed using a first process running a plurality of first threads for each network interface card. The data, which is read from the buffers, is filtered using the same first thread to generate the processed portions of the data stream. If several threads are running simultaneously, then data from each of the multiple buffers can be read by each thread and then filtered by each thread so that only a specific type of data is allowed through by each thread. This filtering process can be used to parse the data stream so that each thread only processes a specific type of data. In operation 720, the processed portions of the data stream are then stored in one of the dedicated shared memories. Since each thread filters out different types of data, the multiple shared memories can each be used to store specific types of data, which are all portions of the original data stream. The threads which are used to read and filter specific types of data can be dedicated for a specific type of data. For example, one thread can be used to read data, filter the data for Type A data and store the Type A data in a shared memory. Similarly another thread can be used to read data, filter the data for Type B data and store the Type B data in a shared memory. This can be generalized so that N threads, where N is a finite integer greater than or equal to 1, can be used to read data, filter the data for N types of data and store the N types of data in N different shared memories.

In operation 725, the processed portions of the data stream stored in the shared memory are read using at least one group of second multiple sub-processes, each with at an optional group of second threads. Each of the shared memories can be read with a different or dedicated thread from the second threads. Next in operation 730, a statistical analysis is performed on the portions of the data stream read from the shared memory. The statistical analysis can be done with the same thread used to read the data from the shared memory or with another one of the threads from the group of second process threads. The thread used to read and/or analyze the data stored in a specific shared memory can be a dedicated second process thread. The statistical analysis also generates statistics data. In operation 735, the statistics data is periodically saved to an Interval file. The periodic saving of the statistics data to the file can be configured by a user and can be, for example, once per day, or once per hour. In another embodiment, the statistics data can be periodically saved to the Interval file when the size of the statistics data reaches some threshold.

In the embodiments described with reference to FIG. 7, the first process and the one or more groups of second multiple processes, each with an optional group of second threads, are independent and communicate with each other via the shared memory. The set of first threads for each network interface card can be different than the optional group of second threads. In some embodiments the first process and the one or more groups of second multiple processes are asynchronous.

Figure 8:
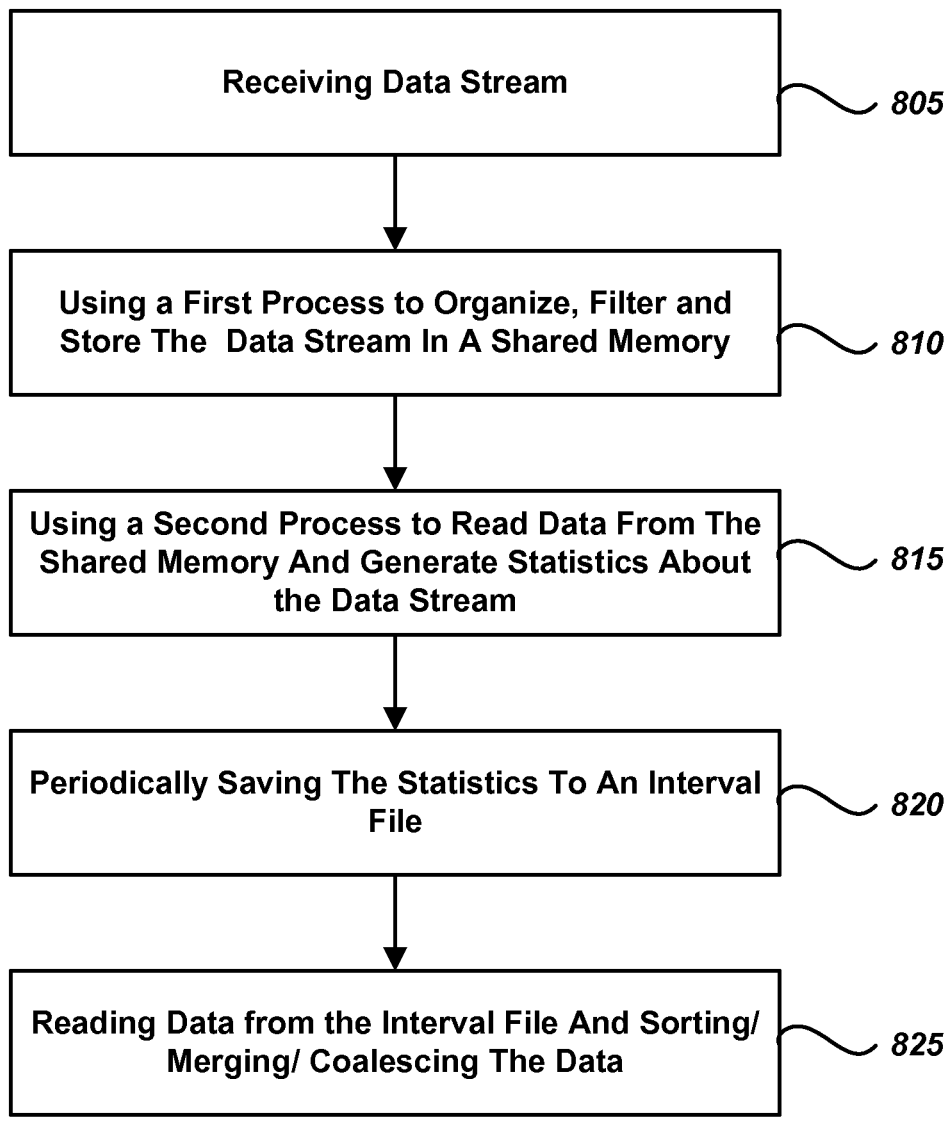
FIG. 8 is flowchart illustrating a method of managing data, in accordance with an embodiment of the invention.

FIG. 8 is a flowchart illustrating another method of managing data streams, in accordance with an embodiment of the invention. The method begins in operation 805 when at least one network interface card receives a data stream. In operation 810, a first process, which runs at least one first thread for each network interface card, processes the received data stream, organizes the processed data stream, filters the processes data stream, and stores the processed data stream in a shared memory. Next in operation 815, the data stored in the shared memory is again processed using at least one group of second multiple processes, where each process has an optional group of second threads. At least one thread, from the group of second threads, is used to read data from the shared memory and generate statistics about the shared memory. If there are multiple shared memories then each of the shared memories can be read with a different or dedicated thread from the second threads. In operation 820, the generated statistics are periodically saved to an Interval file. The periodic saving of the generated statistics to the file can be configured by a user and can be, for example, once per day, or once per hour. In another embodiment, the generated statistics can be periodically saved to the Interval file when the size of the statistics data reaches some threshold. In operation 825, data is read from the Interval file and sorted, merged and coalesced.

In the embodiments described with reference to FIG. 8, the first process and the one or more groups of second multiple processes, each with an optional group of second threads, are independent and communicate with each other via the shared memory. The set of first threads for each network interface card can be different than the optional group of second threads. In some embodiments the first process and the one or more groups of second multiple processes are asynchronous.

According to an embodiment of the invention, a method for managing data streams includes receiving a data stream on at least one network interface card and performing operations on the data stream using a first process running a plurality of first threads for each network interface card. The operations performed using a first process running a plurality of first threads include distributing portions of the data stream among a plurality of buffers for processing by the plurality of first threads, processing each of the portions of data stream stored in each of the plurality of buffers with a dedicated first process thread, and storing each of the processed portions of the data stream in one of a plurality of dedicated shared memories. The dedicated first process thread can be one of the pluralities of first threads. The method also includes performing additional operations on the processed portions of the data stream using at least one group of second multiple processes, each with an optional group of second threads, which include processing each of the processed portions of data stream stored in each of the shared memories with a dedicated second process thread. The dedicated second process thread can be one of the second threads. The first process and the one or more groups of second multiple processes can be independent and communicate via the shared memory. The plurality of first threads for each network interface card can be different than the optional group of second threads.

According to another embodiment of the invention, performing operations in the first process further includes reading the portions of data from each of the multiple buffers using separate multiple dedicated first process threads, and filtering the data read from each of the multiple buffers using the separate multiple dedicated first process threads to generate the processed portions of the data stream.

According to yet another embodiment of the invention, the first process and the second process are asynchronous.

According to yet another embodiment of the invention, each of the multiple buffers is accessed by a separate and different first process thread.

According to yet another embodiment of the invention, each portion of the data stream is stored in a separate one of the multiple buffers.

According to yet another embodiment of the invention, each processed portions of the data stream is stored in a separate shared memory.

According to another embodiment of the invention, a method for managing data streams includes receiving a data stream on at least one network interface card and performing operations on the data stream using a first process running a plurality of first threads for each network interface card. The operations performed using a first process running a plurality of first threads include distributing portions of the data stream among a plurality of buffers for processing by the plurality of first threads, processing each of the portions of data stream stored in each of the plurality of buffers with a dedicated first process thread and storing each of the processed portions of the data stream in one of a plurality of dedicated shared memories. The dedicated first process thread can be one of the pluralities of first threads. The method also includes performing operations on the processed portions of the data stream using at least one group of second multiple processes, each with an optional group of second threads, which include reading the stored processed portions of data stream from each of the shared memories with a dedicated second process thread. The dedicated second process thread can be one of the groups of second threads. The method also includes performing statistics with the dedicated second process thread on the processed portions of data stream read from the shared memory and periodically saving the statistics to an interval file. The first process and the at least one group of second multiple processes can be independent and communicate via the shared memory.

According to yet another embodiment of the invention, a method for managing data streams includes receiving a data stream on at least one network interface card, distributing portions of the data stream among multiple buffers used by a first process running a plurality of threads for each network interface card and processing the portions of the data stream stored in each buffer with the specific thread dedicated to the buffer. Each thread processes data from a specific one of the plurality of buffers. The specific thread can be one of the plurality of threads. The method can further include storing the process data stream in a specified shared memory.

According to yet another embodiment of the invention, a method for managing data streams includes receiving a data stream on at least one network interface card, distributing portions of the data stream among a plurality of buffers, wherein the plurality of buffers are accessed by a first process running a plurality of first process threads and wherein each of the first process threads processes data from a specific one of the plurality of buffers. The method can further include storing a portion of the data stream in a specified shared memory. The method can further include reading data from the shared memory by a second process running a plurality of second process threads. The plurality of second process threads can further perform in-memory interval statistics and periodically save the statistics to an interval file. The first process and the second process can be asynchronous. The method can further include reading data from each of the plurality of buffers using the same first process threads used to process the data from each of the plurality of buffers, and filtering the data read from the plurality of buffers using the same first process threads to generate the processed portions of the data stream. Each of the distributed portions of the data stream can be stored in a separate one of the plurality of buffers. The distributed portions of the data stream can also be stored in a separate shared memory.

According to yet another embodiment of the invention, a method for managing data streams includes receiving a data stream on at least one network interface card and performing operations on the data stream using a first process running a plurality of first threads for each network interface card. The operations performed using a first process running a plurality of first threads include parsing the data stream into multiple sub-data streams, distributing the multiple sub-data streams among multiple buffers, storing a portion of each of the multiple sub-data streams in a shared memories. The method further includes performing additional operations on the multiple sub-data streams using at least one group of second multiple processes each with an optional group of second threads. The additional operations can include reading from the shared memory the portions of the sub-data streams stored in the shared memory and performing statistics on the portions of the sub-data streams read from the shared memory and periodically saving the statistics to an interval file. The first process and the second process can be independent and communicate via the shared memory.

According to yet another embodiment of the invention, a system for managing data streams includes at least one network interface card that receives a data stream and a first processor, which is coupled to at least one of the network interface cards and distributes the data stream among a plurality of buffers. The first processor is configured to run a first process that uses a plurality of first threads for each network interface card. The plurality of first process threads access data stored in the plurality of buffers, processes the accessed data, and stores the processed data in a plurality of shared memories. The plurality of first threads can filter the data accessed from the plurality of buffers for a specific characteristic and save data having a specific characteristic in a specific shared memory. The first processor can distribute copies of the data stream received by the network card and store the copies in one of the plurality of buffers. The system can further include at least one group of second multiple processes that reads data from the shared memory. The at least one group of second multiple processes each can use one or more second threads from the optional group of second threads. The group of second threads can be used to analyze data to generate in-memory interval statistics and periodically save the statistics to an interval file. The shared memory can be a queue.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method for managing data streams, comprising:
receiving a data stream on at least one network interface card;
performing operations on the data stream using a first process running a plurality of first threads for the at least one network interface card, the operations comprising:
distributing at least some portions of the data stream among a plurality of buffers for processing by the plurality of first threads,
processing the at least some portions of the data stream with a dedicated first process thread, wherein the dedicated first process thread is one of the plurality of first threads, and
storing the at least some portions of the data stream that are processed in one of a plurality of dedicated shared memories;
performing operations on the at least some portions of the data stream that are processed using at least one group of second multiple processes with at least one group of second threads comprising:
calculating in-memory interval statistics and periodically saving the in-memory interval statistics to an interval file;
processing the at least some portions of the data stream stored in the one of the plurality of dedicated shared memories with a dedicated second process thread, comprising:
reading the at least some portions of the data stream from the shared memories, and
calculating statistics on the at least some portions of the data stream read from the shared memories and periodically saving the statistics to the interval file,
wherein the dedicated second process thread is one of the second threads;
wherein the first process and the one or more groups of second multiple processes are independent and communicate via the shared memory; and
wherein the plurality of first threads for the network interface cards are different than the at least one group of second threads.

2. The method of claim 1 wherein performing operations in the first process further comprises:
reading the at least some portions of the data stream from the plurality of buffers using separate multiple dedicated first process threads; and
filtering the at least some portions of the data stream read from the plurality of buffers using the separate multiple dedicated first process threads to generate the at least some portions of the data stream that are processed.

3. The method of claim 1 wherein the first process and the second process are asynchronous.

4. The method of claim 1 wherein the plurality of buffers are accessed by a separate and different first process thread.

5. The method of claim 1 wherein the at least some portions of the data stream are stored in a separate one of the plurality of buffers.

6. The method of claim 1 wherein the at least some portions of the data stream that are processed are stored in a separate shared memory.

7. The method for managing data streams, comprising:
receiving a data stream on at least one network interface card;
performing operations on the data stream using a first process running a plurality of first threads for the network interface cards, the operations comprising:
distributing at least some portions of the data stream among a plurality of buffers for processing by the plurality of first threads,
processing the at least some portions of the data stream with a dedicated first process thread, wherein the dedicated first process thread is one of the plurality of first threads, and
storing the least some portions of the data stream in one of a plurality of dedicated shared memories; and
performing operations on the at least some portions of the data stream that are processed using at least one group of second multiple processes running a plurality of second process threads comprising:
reading the at least some portions of the data stream from the shared memories,
calculating statistics on the at least some portions of the data stream read from the shared memory and periodically saving the statistics to an interval file, and
calculating in-memory interval statistics and periodically saving the in-memory interval statistics to the interval file,
wherein the first process and the at least one group of second multiple processes are independent and communicate via the shared memory.

8. The method of claim 7 wherein performing operations in the first process further comprises:
reading data from the plurality of buffers using dedicated first process threads that are the same; and
filtering the data read from the plurality of buffers using the same dedicated first process threads to generate the at least some portions of the data stream that are processed.

9. The method of claim 7 wherein the first process and the second process are asynchronous.

10. The method of claim 7 wherein the plurality of buffers are used only by the first process.

11. The method of claim 7 wherein the at least some portions of the data stream that are distributed are stored in a separate one of the multiple buffers.

12. The method of claim 7 wherein the at least some portions of data stream that are processed are stored in a separate shared memory.

13. The method for managing data streams, comprising:
receiving a data stream on at least one network interface card;
distributing at least some portions of the data stream among multiple buffers used by a first process running a plurality of threads for the at least one network interface card, wherein the each of the plurality of threads process data from a specific one of the multiple buffers;
processing the at least some portions of the data stream with a specific thread dedicated to a one of the plurality of buffers, wherein the specific thread is one of the plurality of threads;

storing the at least some portions of the data stream in a specified shared memory;

reading the at least some portions of the data stream from the shared memory;

calculating statistics on the at least some portions of the data stream read from the shared memory and periodically saving the statistics to an interval file; and reading at least some portions of the data stream from the shared memory by a second process running a plurality of second process threads, wherein the plurality of second process threads further calculates in-memory interval statistics and periodically saves the in-memory interval statistics to the interval file.

14. The method for managing data streams, comprising:

receiving a data stream on at least one network interface card;

distributing at least some portions of the data stream among a plurality of buffers, wherein the plurality of buffers are accessed by a first process running a plurality of first process threads and wherein the first process threads processes data from a specific one of the plurality of buffers;

storing a portion of the data stream in a specified shared memory;

reading the stored portion of the data stream from the shared memory;

performing statistics on the portion of the data stream read from the shared memory and periodically saving the statistics to an interval file; and reading data from the shared memory by a second process running a plurality of second process threads, wherein the plurality of second process threads further calculates in-memory interval statistics and periodically saves the in-memory interval statistics to the interval file.

15. The method of claim 14, wherein the first process and the second process are asynchronous.

16. The method of claim 14 further comprising:

reading data from the plurality of buffers using the same process threads used to process the data from the plurality of buffers; and filtering the data read from the plurality of buffers using the same first process threads to generate the process portions of the data stream.

17. The method of claim 14 wherein the distributed portions of the data stream are stored in a separate one of the plurality of buffers.

18. The method of claim 14 wherein the distributed portions of the data stream are stored in a separate shared memory.

19. The method for managing data streams, comprising:

receiving a data stream on at least one network interface card;

performing operations on the data stream using a first process running a plurality of first threads for the network interface cards, the operations comprising:

parsing the data stream into multiple sub-data streams, distributing the multiple sub-data streams among multiple buffers, and storing a portion of the multiple sub-data streams in a shared memory; and performing operations on the multiple sub-data streams using at least one group of second multiple processes running a plurality of second process threads comprising:

reading from the shared memory the multiple sub-data streams stored in the shared memory, calculating statistics on the sub-data streams that are read from the shared memory and periodically saving the statistics to the interval file, and calculating in-memory interval statistics and periodically saving the in-memory interval statistics to the interval file, wherein the first process and the second process are independent and communicate via the shared memory.

20. A system for managing data streams, comprising:

at least one network interface card that receives a data stream;

a first processor, which is coupled to at least one of the network interface cards and distributes the data stream among a plurality of buffers, the first processor configured to:

run a first process that uses a plurality of first threads for the network interface cards, wherein the plurality of first process threads access data stored in the plurality of buffers, processes the accessed data, and stores the processed data in a plurality of shared memory, run a second process that uses a plurality of second process threads, wherein the plurality of second process threads calculates in-memory interval statistics and periodically saves in-memory interval the statistics to an interval file, read the stored processed data from the shared memory, and calculate statistics on the stored processed data that was read from the shared memory and periodically saves the statistics to the interval file.

21. The system of claim 20 wherein the plurality of first threads filter the data accessed from the plurality of buffers for a specific characteristic and save data having a specific characteristic in a specific shared memory.

22. The system of claim 20 wherein the first processor distributes copies of the data stream received by the at least one network card and stores the copies in one of the plurality of buffers.

23. The system of claim 20 further comprising at least one group of second multiple processes that reads data from the shared memory, wherein the at least one group of second multiple processes use at least one group of second threads.

24. The system of claim 20 wherein the at least one group of second multiple processes analyze data to generate in-memory interval statistics and periodically save the statistics to an interval file.

25. The system of claim 20 wherein the shared memory is a queue.

* * * * *